(12) United States Patent
Moradi-Araghi et al.

(10) Patent No.: US 8,669,214 B2
(45) Date of Patent: Mar. 11, 2014

(54) SWELLABLE POLYMER WITH ANIONIC SITES

(75) Inventors: Ahmad Moradi-Araghi, Bixby, OK (US); James H. Hedges, Bartlesville, OK (US); David R. Zornes, Bartlesville, OK (US); Riley B. Needham, Bartesville, OK (US); Huili Guan, Lawrence, KS (US); Jenn-Tai Liang, Lawrence, KS (US); Cory Berkland, Lawrence, KS (US); James P. Johnson, Houston, TX (US); Min Cheng, Bartlesville, OK (US); Faye L. Scully, Bartlesville, OK (US)

(73) Assignees: ConocoPhillips Company, Houston, TX (US); University of Kansas, Lawrence, KS (US)

( * ) Notice: Subject to any disclaimer, the term of this patent is extended or adjusted under 35 U.S.C. 154(b) by 624 days.

(21) Appl. No.: 12/797,402

(22) Filed: Jun. 9, 2010

(65) Prior Publication Data
US 2010/0314114 A1 Dec. 16, 2010

Related U.S. Application Data

(60) Provisional application No. 61/185,626, filed on Jun. 10, 2009.

(51) Int. Cl.
*C08J 9/16* (2006.01)
*E21B 43/16* (2006.01)

(52) U.S. Cl.
USPC ........... 507/225; 507/219; 507/221; 507/224; 507/226; 507/227; 507/229; 507/235; 507/242; 507/244; 507/247; 507/248; 507/249; 507/255; 507/259; 166/305.1

(58) Field of Classification Search
None
See application file for complete search history.

(56) References Cited

U.S. PATENT DOCUMENTS

| | | | | |
|---|---|---|---|---|
| 3,251,194 A | * | 5/1966 | Walker | 62/66 |
| 3,480,546 A | * | 11/1969 | Bashaw et al. | 169/47 |
| 3,727,688 A | | 4/1973 | Clampitt | |
| 3,749,172 A | | 7/1973 | Hessert et al. | |
| 3,798,836 A | * | 3/1974 | Rubens et al. | 47/63 |
| 4,068,714 A | | 1/1978 | Hessert et al. | |
| 4,683,949 A | | 8/1987 | Sydansk et al. | |
| 5,973,042 A | * | 10/1999 | Yoshinaga et al. | 524/192 |
| 6,454,003 B1 | | 9/2002 | Chang et al. | |
| 6,729,402 B2 | | 5/2004 | Chang et al. | |
| 6,960,617 B2 | | 11/2005 | Omidian | |
| 6,984,705 B2 | | 1/2006 | Chang et al. | |
| 7,300,973 B2 | | 11/2007 | Chang et al. | |
| 2003/0149212 A1 | | 8/2003 | Chang | |
| 2008/0075667 A1 | | 3/2008 | Berkland et al. | |

FOREIGN PATENT DOCUMENTS

| | | |
|---|---|---|
| EP | 1734011 | 12/2006 |
| KZ | 2005/0712.1 | 12/2006 |

OTHER PUBLICATIONS

U.S Appl. No. 12/722,344, filed Mar. 11, 2010, Moradi-Araghi et al.
U.S. Appl. No. 12/780,792, filed May 14, 2010, Moradi-Araghi et al.
U.S. Appl. No. 12/797,402, filed Jun. 9, 2010, Moradi-Araghi et al.
U.S. Appl. No. 12/815,314, filed Jun. 14, 2010, Moradi-Araghi et al.
Yuping Wei and Fa Cheng, Synthesis and aggregates of cellulose-based hydrophobically associating polymer, Carbohydrate Polymers 68(4):734-739 (2007).
SPE 89413 (2004); Larry Eoff, Presentation at the 2004 SPE/DOE Fourteenth Symposium on Improved Oil Recovery held in Tulsa, Oklahoma, USA Apr. 17-21, 2004 SPE 89413 (2004).
SPE 113264 (2008); F. Aktas, Presentation at 2008 SPE/DOE Symposium on Improved Oil Recovery held in Tulsa, USA, Apr. 19-23, 2008.
SPE 99441 (2008); Dongmei Wang, Presentation at the 2006/SPE/DOE Symposium on Improved Oil Recovery, Tulsa, Apr. 22-26.
SPE 29008 (1995); K.C. Taylor, Presentation at the SPE International Symposium on Oilfield Chemistry held in San Antonio, Tx, USA Feb. 14-17, 1995.
Youjun Deng, et al., Adsorption of Polyacrylamide on Smectite, Illite, and Kaolinite, Soil Sci Soc Am J 70:297-304 (2006).

* cited by examiner

*Primary Examiner* — John J Figueroa
(74) *Attorney, Agent, or Firm* — Boulware & Valoir

(57) ABSTRACT

The invention is directed to stable crosslinked water-soluble swellable polymers and methods for making same. More particularly, the invention relates to a composition comprising expandable polymeric particles having anionic sites and labile crosslinkers and stable crosslinkers, said particle mixed with a fluid and a cationic crosslinker that is capable of further crosslinking the particle on degradation of the labile crosslinker and exposure of the anionic sites so as to form a gel. A particularly important use is as an injection fluid in petroleum production, where the expandable polymeric particles are injected into target zone and when the heat and/or suitable pH of the target zone cause degradation of the labile crosslinker and the particle expands, the cationic crosslinker crosslinks the polymer to form a gel, thus diverting water to lower permeability regions and improving oil recovery.

15 Claims, No Drawings

SWELLABLE POLYMER WITH ANIONIC SITES

CROSS-REFERENCE TO RELATED APPLICATIONS

This application claims priority to U.S. Provisional Application No. 61/185,626 filed Jun. 10, 2009, which is incorporated herein by reference in its entirety.

FEDERALLY SPONSORED RESEARCH STATEMENT

Not applicable.

REFERENCE TO MICROFICHE APPENDIX

Not applicable.

FIELD OF THE INVENTION

The invention relates to crosslinked swellable polymers containing anionic sites that after swelling can be further crosslinked in situ with cationic crosslinkers, such as polyvalent metal cations or cationic polymers, and methods for making same. A particularly important use is as fluid diversion agents for sweep improvement in enhanced oil recovery applications and also as drilling fluids in petroleum production, but applications can also include uses in the hygiene and medical arts, packaging, agriculture, the cable industry, information technology, in the food industry, papermaking, use as flocculation aids, and the like.

BACKGROUND OF THE INVENTION

A "smart gel" is a material that gels in response to a specific physical property. For example, it may gel at a specific temperature or pressure. Although finding many industrial uses, our interest in smart gels lies in their uses in oil and gas production, and in particular as a diverting agent to improve oil recovery from reservoirs.

The water injection method used in oil recovery is where water is injected out into the reservoir to stimulate production. Water is injected for two reasons: 1. For pressure support of the reservoir (also known as voidage replacement). 2. To sweep or displace the oil from the reservoir, and push it towards an oil production well. Normally only 20% of the oil in a reservoir can be extracted, but water injection increases that percentage (known as the recovery factor) and maintains the production rate of a reservoir over a longer period of time.

However, sweep recovery is limited by the so-called "thief zones," whereby water preferentially travels through the more permeable regions of the reservoirs, bypassing less permeable zones, leaving unswept oil behind. One means of further improving recovery is to block thief zones with a polymer or other material, thus forcing water through the less permeable regions.

U.S. Pat. No. 6,454,003, U.S. Pat. No. 6,984,705 and U.S. Pat. No. 7,300,973 describe what might be called a "smart polymer" since its properties change in response to particular stimuli. These patents describe an expandable crosslinked polymeric particle having an average particle diameter of about 0.05 to 10 microns. The particle is highly crosslinked with two crosslinkers, one that is stable and a second that is labile. The excess crosslinking makes the initial particles quite small, allowing efficient propagation through the pores of a reservoir. On heating to reservoir temperature and/or at a predetermined pH or other stimuli, the reversible (labile) internal crosslinks break, allowing the particle to further expand by absorbing additional injection fluid, usually water. The initial polymeric particle is sometimes called the "kernel" before its expansion, in analogy to the way a kernel of popcorn "pops" in response to certain stimuli, such as heat.

The unique properties of this particle allows it to fill the high permeability zones—commonly called thief zones or streaks—and then be expanded so that the swollen particle blocks the thief zones and subsequent injections of fluid are forced to enter the remainder of the reservoir, more effectively sweeping the reservoir. However, the method is limited in practice because subsequent water injections always remove some of the polymer, thus the thief zones become washed out and again transport most of the injection water limiting the injection fluid entering the less permeable zones.

The reason for the washout is not certain, but our own research suggests that the swollen polymer is not in gel form, thus although viscous, is a liquid and can be washed out of the porous substrate.

What is needed in the art is a "smart gel" that is less susceptible to loss under the conditions of use. In particular, a swellable polymer that is resistant to wash out by subsequent fluid injections is needed, but the polymers will have utility in any application where swellable polymers are desired.

SUMMARY OF THE INVENTION

The invention generally relates to smart gels that have stable and labile crosslinkers, allowing swelling in situ in response to a particular stimuli. Further, the swelled polymeric particles contain anionic sites that become accessible on swelling of the polymer and can then be further crosslinked using cationic crosslinkers, such as polyvalent metal crosslinkers or cationic polymers to produce gels.

Some of the more common inorganic crosslinking agents include cations of chromium, iron, vanadium, aluminates, borates, titanium, zirconium, aluminum, and their salts, chelates and complexes thereof. Complexed or chelated metal cations are preferred because they slow the rate of gelation, as are nanoparticles that slowly release metal ions. Common organic cationic polymers include polyethyleneimine and the polyquaternium polymers.

The anionic sites include the various acids such carboxylic, nitric, phosphoric, chromic, sulfuric, sulphonic, vinylogous carboxylic acids and the like. Suitable polymers having anionic sites include biopolysaccharides, cellulose ethers, and acrylamide-based polymers, with negatively charged monomers.

Preferably, the smart gels of the invention comprise a highly crosslinked expandable polymeric particles having labile crosslinkers and stable crosslinkers, wherein at least one of the monomers that makes up the polymer or copolymer contains anionic sites. A suitable cationic crosslinker is added to the particles after they are made or after the labile crosslinker degrades or any time therebetween. In certain embodiments it may be possible to convert a nonionic polymer to an anionic polymer, but the incorporation of anionic monomers is preferred to ensure adequate dispersion of anionic sites and for ease of use.

In reservoir applications, the cationic crosslinker can be injected after swelling of the polymer, but it can also be combined with the unexpanded particle in the initial injection fluid, and if necessary for the application, the rate of gelation can be delayed by means known in the art in order to allow the particle to fully swell before commencing the gelation. In yet another embodiment, anionic particles and a second population of cationic crosslinker loaded particles can be combined and used.

The polymer of the invention has particular use in oil recovery, as described above, and is preferably a hydrophilic polymer for this application. However, such polymers would find uses in all of the arts where swellable polymers are in current use and loss is not desired, including as filler for diapers and other hygiene products, medical devices such as orthopedic insoles, ocular devices, and biomimetic implants, wipe and spill control agents, wire and cable water-blocking agents, ice shipping packs, controlled drug release, agricultural uses (e.g., soil additive to conserve water, plant root coating to increase water availability, and seed coating to increase germination rates), industrial thickeners, specialty packaging, tack reduction for natural rubber, fine coal dewatering, and the like.

By "polymer" what is meant is polymerized monomers, including mixtures of two or more monomers.

A "stable crosslinker" is defined herein to be any crosslinker that is not degraded under the stimuli that causes the labile crosslinker to disintegrate. Representative non-labile crosslinkers include methylene bisacrylamide, diallylamine, triallylamine, divinyl sulfone, diethyleneglycol diallyl ether, and the like and combinations thereof. A preferred non-labile crosslinking monomer is methylene bisacrylamide.

The "labile crosslinker" is defined herein to be any crosslinker that decays or is reversible on application of a particular stimulus, such as irradiation, suitable pH, temperature, etc. and combinations thereof. Representative labile crosslinkers include acrylate or methacrylate esters of di, tri, tetrahydroxy compounds including ethyleneglycol diacrylate, polyethyleneglycol diacrylate, trimethylopropane trimethacrylate, ethoxylated trimethylol triacrylate, ethoxylated pentaerythritol tetracrylate, and the like; divinyl or diallyl compounds separated by an azo such as the diallylamide of 2,2'-Azobis(isobutyric acid) and the vinyl or allyl esters of di or tri functional acids, and combinations thereof. Preferred labile crosslinking monomers include water soluble diacrylates such as polyethylene glycol (PEG) 200-1000 diacrylate, especially PEG 200 diacrylate and PEG 400 diacrylate, and polyfunctional vinyl derivatives of a polyalcohol such as ethoxylated (9-20) trimethylol triacrylate and polymethyleneglycol diacrylate.

US2008075667, herein incorporated by reference, describes additional acid labile ketal cross linkers that can be used in the invention. Such acid labile ketal crosslinker have one of the following formulas:

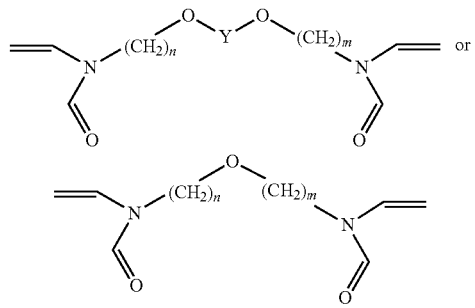

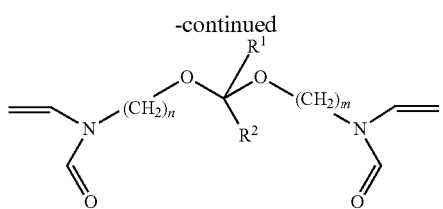

wherein Y is a lower alkyl, n and m are independently an integer of between 1 and 10 and R1 and R2 are independently a lower alkyl.

In particular, 2-bis[2,2'-di(N-vinylformamido)ethoxy]propane (BDEP) and 2-(N-vinylformamido)ethyl ether (NV-FEE) are described and may be suitable in acidic environments, or where the acid is later added thereto. Such cross linkers can be advantageously combined with the monomers described therein, such as N-vinyl pyrollidone, N-vinyl formamide, N-vinylacetamide, N-vinylacetamine and other vinyl containing polymers and copolymers thereof, and may be preferred where the neurotoxic effects of acrylamide are to be avoided.

"Cationic crosslinkers" are defined herein to be molecules that can crosslink the anionic polymers, and include cationic polymers and polyvalent metals, chelated polyvalent metals, and compounds or complexes capable of yielding polyvalent metals.

By "complex" or "complexed" what is meant is that the polyvalent metal crosslinker is present with or within another molecule that will release the metal ions under the conditions of use, and includes the use of metal salts, chelates, nanoparticles, and the like.

The proportion of stable to labile crosslinker can also vary depending on how much swelling on stimulus is required, but in the enhanced oil recovery applications a great deal of swelling is desired to effectively block the thief zones and increase the mobilization and/or recovery rate of hydrocarbon fluids present in the formations. Thus, the concentration of labile crosslinker greatly exceeds the concentration of stable crosslinker. To obtain sizes in the range of about 0.05 to about 10 microns suitable for injection fluid use the crosslinker content is about 1,000-200,000 ppm of labile crosslinker and from ≥0-300 ppm of non-labile crosslinkers.

Combinations of multiple stable and labile crosslinkers can also be employed advantageously. Reaction to stimuli can also be controlled by labile crosslinker selection, as needed for particular reservoir conditions or for the application at issue. For example, judicious selection of labile crosslinkers—one that degrades at a very high temperature and another at a lower temperature—can affect the temperature and pH at which the kernel pops.

Other crosslinkers include, but are not limited to, diacrylyl tertiary amides, diacrylylpiperazine, diallyltartardiamide (DATD), dihydroxyethylene-bis-acrylamide (DHEBA), and bis-acrylylcystamine (BAC), trimethylolpropane trimethacrylate (TMPTMA), propyleneglycol triacrylate (PGTA), tripropyleneglycol diacrylate (TPGDA), allyl methacrylate (AMA), triethyleneglycol dimethacrylate (TEGDMA), tetrahydrofurfuryl methacrylate (TFMA) and trimethylolpropane triacrylate (TMPTA). Multifunctional crosslinkers include, but are not limited to, pentaerythritol triacrylate, 1,5 pentane diol dimethacrylate, and pentaerythritol triallylether.

It is believed that the carboxylate and/or other anionic constituents are the crosslinking sites in the polymer and that the polymer cannot gel if there are too few crosslinking sites in the polymer, i.e., less than about 1.0 mole percent based on the total number of monomeric groups in the polymer. U.S. Pat. No. 4,683,949 shows gelation rates for a number of different polymers and conditions and is incorporated herein by reference.

The solvent of the gelation system is an aqueous liquid, such as deionized water, potable water, fresh water, or brine having a total dissolved solids concentration up to the solubility limit of the solids in water. Inert fillers known in the art may also be added to the gelation system to reinforce the subsequent gel if desired or for use as proppants. Such fillers include crushed or naturally fine rock material or glass beads, sand and the like.

Representative anionic monomers that can be used include the following acids and their sodium, potassium and ammonium salts: acrylic acid, methacrylic acid, maleic acid, itaconic acid, 2-propenoic acid, 2-methyl-2-propenoic acid, 2-acrylamido-2-methyl propane sulfonic acid, sulfopropyl acrylic acid and other water-soluble forms of these or other polymerizable carboxylic or sulphonic acids, sulphomethylated acrylamide, allyl sulphonic acid, vinyl sulphonic acid, and the like. Preferred anionic monomers include sodium acrylates.

Representative nonionic monomers include acrylamide, N-isopropylacrylamide, N,N-dimethylacrylamide, N,N-diethylacrylamide, dimethylaminopropyl acrylamide, dimethylaminopropyl methacrylamide, acryloyl morpholine, hydroxyethyl acrylate, hydroxypropyl acrylate, hydroxyethyl methacrylate, hydroxypropyl methacrylate, dimethylaminoethylacrylate (DMAEA), dimethylaminoethyl methacrylate (DMAEM), maleic anhydride, N-vinyl pyrrolidone, vinyl acetate and N-vinyl formamide. Preferred nonionic monomers include acrylamide, N-methylacrylamide, N,N-dimethylacrylamide and methacrylamide. Acrylamide is more preferred. N-vinyl pyrollidone, N-vinyl formamide, N-vinylacetamide, N-vinylacetamine and copolymers may be preferred with the acid labile ketal crosslinkers of US2008075667.

Cationic and betaine monomers can be combined with the polymeric particles of the invention, but their use is not preferred as they would compete for binding to the anionic sites. However, small amounts may be acceptable, provided the anionic sites predominate.

Representative swellable polymers also include polymers and copolymers of acrylamide and 2-acrylamido-2-methyl propane sulfonic acid (and its sodium salt), copolymers of acrylamide and sodium acrylate, terpolymers of acrylamide, 2-acrylamido-2-methyl propane sulfonic acid (and its sodium salt) and sodium acrylate and homopolymers of 2-acrylamido-2-methyl propane sulfonic acid (and its sodium salts), poly(2-hydroxyethyl methacrylate), poly(2-hydroxypropyl methacrylate), poly(isobutylene-co-maleic acid), and the like.

The "polyvalent metal crosslinker" of the present invention is defined as a salt or a complex of a tri- or quatravalent metal cation wherein the metal cation is capable of crosslinking a polymer having anionic sites. Exemplary polyvalent metal crosslinking agents useful in the practice of the present invention are complexes or chelates of $Al^{3+}$, $Fe^{3+}$, $Cr^{3+}$, $Ti^{4+}$, $Sn^{4+}$, $Zr^{4+}$ and the like. Preferred crosslinking agents of the present invention contain $Al^{3+}$, $Zr^{4+}$ or $Cr^{3+}$, and their acetates, nitrates, phosphates, carbonates, tartrates, malonates, propionates, benzoates, or citrates thereof, and the like. Combinations of cationic crosslinkers can also be used.

The polyvalent metal cations can be employed in the form of complexes with an effective sequestering amount of one or more chelating or sequestering anions. Slow release nanoparticles and macroparticles can also be employed. Chromium and zirconium are the preferred cations in high salinity brines including hard brine. High salinity brine contains on the order of at least about 30,000 ppm total dissolved solids. Thus, the combination of the particular chelating or sequestering agent in conjunction with the preferred chromium(III) and Zr(IV) cations confers high brine tolerance.

The cationic polymers of the invention include homopolymers of the following: dimethyldiallyl ammonium chloride, ethyleneimine, methacrylamido propyl trimethyl ammonium chloride, 2-methacryloyloxyethyl trimethyl ammonium methosulfate and diquaternary ionene, and the like. A preferred cationic crosslinker is polyethyleneimine (PEI), which has a high charge ratio.

The particles can be prepared by methods known in the art, including the inverse emulsion polymerization technique described in U.S. Pat. No. 6,454,003, U.S. Pat. No. 6,729,402 and U.S. Pat. No. 6,984,705. Particle suspensions are prepared by mixing the particles with injection fluid, or inverse suspensions of particles are inverted with a surfactant and/or sufficient shearing and additional injection fluid can be added if needed.

In addition to the expandable polymeric particles having anionic sites and both labile and stable crosslinkers and the cationic crosslinker, the aqueous solution may also contain other conventional additives including chelating agents, pH adjusters, initiators and other conventional additives, accelerators, retardants, surfactants, stabilizers, etc., as appropriate for the particular application.

The rate of gelation with the polymers can be controlled, as is known in the art. Thus, temperature and pH can affect the rate of gelation, as can the use of metal complexes or metal nanoparticles or other means to slow the rate of release of metal cations, as needed for a particular application. In addition, the gels can be destroyed with the use of strong oxidizing agents such as sodium hypochlorite.

In one embodiment, the invention is a composition comprising a fluid, a cationic crosslinker and expandable polymeric particles having anionic sites and both labile and stable crosslinkers. In another embodiment, the invention is a composition comprising expandable polymeric particles having anionic sites and both labile and stable crosslinkers, said particle combined with a fluid and a cationic crosslinker that is capable of crosslinking the anionic sites in the popped polymer and forming a gel that is resistant to washout.

In another embodiment, the invention is a composition comprising highly crosslinked expandable polymeric particles having an unexpanded volume average particle size diameter of from about 0.05 to about 10 microns and a crosslinking agent content of from about 1,000 to about 200,000 ppm of labile crosslinkers and from 0 to about 300 ppm of stable crosslinkers, combined with a cationic crosslinker and a fluid.

In another embodiment, the invention is a method of increasing the recovery of hydrocarbon fluids in a subterranean formation comprising injecting into the subterranean formation a composition comprising a fluid, a cationic crosslinker and a highly crosslinked expandable polymeric particle having anionic sites, wherein polymeric particle has an unexpanded volume average particle size diameter of 0.05-10 microns and a crosslinker content of about 1,000-200,000 ppm of labile crosslinker and about ≥0-300 ppm of stable crosslinker, said polymeric particle has a smaller diameter than the pore throats of the subterranean formation, and said labile crosslinkers break under the conditions of temperature and suitable pH in the subterranean formation to allow the polymeric particle to expand, thus exposing the anionic sites so that said cationic crosslinker can react with the anionic sites to form a gel.

In preferred embodiments, the polymeric particles can be a copolymer of acrylamide and sodium acrylate, the stable crosslinker can be methylene bisacrylamide, and the labile crosslinker can be a polyethylene glycol diacrylate. The cationic crosslinker is selected from polyethyleneimine, $Al^{3+}$, $Fe^{3+}$, $Cr^{3+}$, $Ti^{4+}$, $Sn^{4+}$, or $Zr^{4+}$.

DESCRIPTION OF EMBODIMENTS OF THE INVENTION

The invention provides a novel polymer containing anionic sites that swells on a stimuli and is then additionally treated with a cationic crosslinker that acts to gel the polymer by providing additional crosslinking. Such smart gels have particular utility in sweeping reservoirs, but many uses are possible.

Example 1

Prior Art

We ran a number of slim tube tests in which we injected about 1 pore volume of BRIGHTWATER® particles (NALCO®, copolymer of acrylamide and sodium AMPS crosslinked with methylene bis-acrylamide and PEG diacrylate) into 40' slim tubes packed with sand. The sand pack was then heated (150-190° F.) to allow the polymer to pop. Afterwards, water was injected into the sand packs and the resistance to the flow of water measured. While the popped polymers initially exhibited good resistance factors, this behavior appeared to washout with additional water injection. Typically within one pore volume of water injection the Residual Resistance Factor (RRF) dropped to a number about 1-2. This behavior was observed with slim tubes which were packed with 6.7 Darcy sand as well as 1 Darcy sand. Therefore, the treatment effect of porous media with these particles was only temporary.

Example 2

Invention

Since the prior art polymer is subject to washout, we propose that when combined with suitable anionic sites and further crosslinked with polyvalent metal cations or a cationic polymer, such as PEI, the resulting gel will remain resistant to washout! After the polymer reaches the target zone in the reservoir, the unstable internal crosslinkers PEG-200 or PEG-400 diacrylates hydrolyze and the particle then opens up (swells, pops). The addition of the cationic crosslinker such as $Cr^{3+}$ or PEI will crosslink the expanded polymeric particles via the anionic sites, and is predicted to result in gel that is much more resistant to washout.

We injected a gelant mixture containing 0.5% anionic microparticles of the present invention along with crosslinker-loaded particles containing 100 ppm Cr(III) and 1200 ppm PEI into a 30' long slim tube (6 sections, 5' each) packed with 4.5 Darcy sand. The gelant was injected into the first 0.5 PV of the sandpack and then pushed slightly further into the tube with additional brine injection. The sandpack system was then shut in at 150° F. to allow the gelation to occur. Several ampoules containing the gelant mixture were also placed in the oven to monitor the gelation progress. Brine was periodically injected into the sandpack and the resistance to the flow was measured. The flow resistance gradually increased over time, and eventually a persistent ultra-high (>2000) RRF value was achieved, indicating superiority of the invention polymer over prior art example.

The following references are incorporated by reference herein in their entirety.

U.S. Pat. No. 6,454,003, U.S. Pat. No. 6,729,402 and U.S. Pat. No. 6,984,705
U.S. Pat. No. 3,727,688
U.S. Pat. No. 4,068,714
U.S. Pat. No. 3,749,172
U.S. Pat. No. 4,683,949
US2008075667

What is claimed is:

1. A composition comprising expandable polymeric particles having charged monomers and being internally crosslinked with both labile crosslinkers and stable crosslinkers, said particle combined with a fluid and an external cationic crosslinker that is capable of further crosslinking the particle on degradation of the labile crosslinker so as to form a gel, wherein said charged monomers have predominantly anionic sites.

2. The composition of claim 1, wherein the anionic site is selected from the group consisting of a carboxylate, a sulphate, a sulphonate, a nitrate, or a phosphate groups.

3. The composition of claim 1, wherein the cationic crosslinker is at least one selected from the group consisting of $Al^{3+}$, $Fe^{3+}$, $Cr^{3+}$, $Ti^{4+}$, $Sn^{4+}$, $Zr^{4+}$ or polyethylenimine (PEI).

4. The composition of claim 1, wherein the expandable polymeric particles comprise a copolymer of acrylamide and sodium acrylate.

5. The composition of claim 1, wherein the stable crosslinker is methylene bisacrylamide and the labile crosslinker is a diacrylate.

6. The composition of claim 1, wherein the expandable polymeric particles comprise a copolymer of acrylamide and sodium acrylate, the stable crosslinker comprises methylene bisacrylamide, and the labile crosslinker comprises a polyethylene glycol diacrylate, and the cationic crosslinker is a polyvalent metal cation or a cationic polymer.

7. The composition of claim 1, wherein the expandable polymeric particles comprise a copolymer of acrylamide and sodium acrylate, the stable crosslinker comprises methylene bisacrylamide, the labile crosslinker comprises a polyethylene glycol diacrylate, and the cationic crosslinker is at least one selected from the group consisting of a cationic polymer, $Al^+$, $Fe^{3+}$, $Cr^{3+}$, $Ti^{4+}$, $Sn^{4+}$, $Zr^{4+}$ and complexes or nanoparticles containing same.

8. The composition of claim 1, wherein the labile crosslinker is an acid labile ketal of the formula:

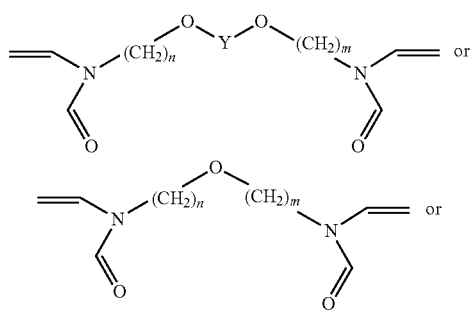

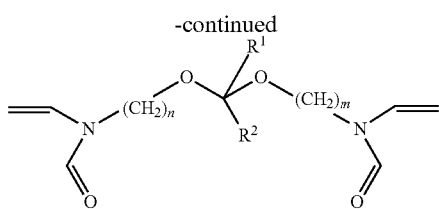

wherein Y is a lower alkyl, wherein n and m are independently an integer of between 1 and 10, and wherein R1 and R2 are independently a lower alkyl.

9. The composition of claim 1, wherein the labile crosslinker is 2-bis[2,2'-di(N-vinylformamido)ethoxy]propane.

10. The composition of claim 1, wherein the labile crosslinker is 2-bis[2,2'-di(N-vinylformamido)ethoxy]propane and the expandable polymeric particles comprise polymers of N-vinyl formamide, N-vinylacetamide, or N-vinylacetamine, or mixtures thereof.

11. A composition comprising highly crosslinked expandable hydrophilic polymeric particles having charged monomers and an unexpanded volume average particle size diameter of about 0.05 to about 10 microns and an internal crosslinking agent content of from about 1,000 to about 200,000 ppm of labile crosslinkers and from >0 to about 300 ppm of stable crosslinkers, combined with an external cationic crosslinker and a fluid comprising water, wherein said charged monomers have predominantly anionic sites.

12. The composition of claim 11, wherein the cationic crosslinker is at least one selected from the group consisting of PEI, or $Al^{3+}$, $Fe^{3+}$, $Cr^{3+}$, $Ti^{4+}$, $Sn^{4+}$, $Zr^{4+}$ and complexes thereof or nanoparticles containing same.

13. The composition of claim 11, wherein the expandable hydrophilic polymeric particles comprise a copolymer of acrylamide and sodium acrylate.

14. The composition of claim 11, wherein the stable crosslinker is methylene bisacrylamide and the labile crosslinker is polyethylene glycol diacrylate.

15. The composition of claim 11, wherein the labile crosslinker is an acid labile ketal, or 2-bis[2,2'-di(N-vinylformamido)ethoxy]propane or the labile crosslinker comprises a diacrylate or polyethylene glycol diacrylate, and the expandable hydrophilic polymeric particles comprise polymers of N-vinyl formamide, N-vinylacetamide, N-vinylacetamine, acrylamide, sodium acrylate or mixtures thereof.

* * * * *